United States Patent
Daviet et al.

(10) Patent No.: US 8,366,427 B2
(45) Date of Patent: Feb. 5, 2013

(54) TIRE MOLD WITH POSITIVE MOLD OPENING SYSTEM

(75) Inventors: Gilles R. Daviet, Greenville, SC (US); James E. Hatley, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 28 days.

(21) Appl. No.: 13/002,204

(22) PCT Filed: Jun. 30, 2008

(86) PCT No.: PCT/US2008/068847
§ 371 (c)(1), (2), (4) Date: Dec. 30, 2010

(87) PCT Pub. No.: WO2010/002392
PCT Pub. Date: Jan. 7, 2010

(65) Prior Publication Data
US 2011/0111075 A1    May 12, 2011

(51) Int. Cl.
   *B29C 35/02* (2006.01)
(52) U.S. Cl. ............................. 425/46; 425/47
(58) Field of Classification Search ............ 425/46, 425/47
   See application file for complete search history.

(56) References Cited

U.S. PATENT DOCUMENTS

| | | |
|---|---|---|
| 3,460,197 A | 8/1969 | Cantarutti et al. |
| 3,464,090 A | 9/1969 | Cantarutti et al. |
| 3,730,658 A | 5/1973 | Marra |
| 3,778,203 A | 12/1973 | MacMillan |
| 3,787,155 A | 1/1974 | Zangl |
| 3,806,288 A | 4/1974 | Materick |
| 3,901,632 A | 8/1975 | Prosdocimi |
| 3,910,735 A | 10/1975 | Caretta |
| 3,922,122 A | 11/1975 | Bottasso et al. |

(Continued)

FOREIGN PATENT DOCUMENTS

| DE | 1901130 | * 7/1970 |
|---|---|---|
| DE | 3208080 | 10/1982 |

(Continued)

OTHER PUBLICATIONS

PCT/US2008/068847 International Search Report dated Oct. 2, 2008.

(Continued)

*Primary Examiner* — James Mackey
(74) *Attorney, Agent, or Firm* — Hahn Loeser & Parks LLP; Bret A. Hrivnak, Esq.

(57) ABSTRACT

A curing mold includes an upper mold portion having a plurality of upper and lower sections radially translatable between open and closed positions, wherein each of the lower sections are positioned adjacent one of the upper sections to form a plurality of pairs of upper and lower sections. The tire mold also includes a pin extending from a first section of each pair of sections, and an aperture extending within a second section of each pair of sections, the aperture including an opening and positioned for receiving a portion of the pin extending from the corresponding first section when the mold is in a substantially closed position. Particular embodiments of the present invention also include a first plurality of radially translatable sections arranged to form an expandable ring and one or more first synchronization members extending between adjacent sections of the first plurality of sections.

21 Claims, 11 Drawing Sheets

U.S. PATENT DOCUMENTS

| | | | |
|---|---|---|---|
| 3,990,823 | A | 11/1976 | Le Moullac |
| 4,013,390 | A * | 3/1977 | Moeller et al. ............... 425/46 |
| 4,022,554 | A | 5/1977 | MacMillan |
| 4,068,989 | A | 1/1978 | Cantarutti |
| 4,608,219 | A | 8/1986 | Singh et al. |
| 4,828,471 | A | 5/1989 | Schlautmann |
| 4,883,415 | A | 11/1989 | Salvadori |
| 5,120,209 | A | 6/1992 | MacMillan |
| 5,165,939 | A | 11/1992 | Pizzorno |
| 5,190,767 | A | 3/1993 | Beres et al. |
| 5,208,044 | A | 5/1993 | Miyata et al. |
| 5,234,326 | A | 8/1993 | Galli et al. |
| 5,466,140 | A | 11/1995 | Imler et al. |
| 5,676,980 | A | 10/1997 | Gulka et al. |
| 6,017,206 | A | 1/2000 | Soulalioux |
| 6,318,985 | B1 | 11/2001 | Heindel et al. |
| 6,632,393 | B2 | 10/2003 | Fike |
| 6,669,457 | B2 | 12/2003 | Scarzello et al. |
| 6,716,013 | B2 | 4/2004 | Fike |
| 6,808,377 | B1 | 10/2004 | Loney et al. |
| 6,841,113 | B2 | 1/2005 | Caretta |
| 7,189,069 | B2 | 3/2007 | Yovichin et al. |
| 7,314,361 | B2 | 1/2008 | Matsumoto et al. |
| 7,976,299 | B2 | 7/2011 | Sano et al. |
| 8,016,578 | B2 * | 9/2011 | Secchi et al. ............... 425/46 |
| 2004/0046286 | A1 | 3/2004 | Seko et al. |
| 2005/0226951 | A1 | 10/2005 | Kata |

FOREIGN PATENT DOCUMENTS

| | | | |
|---|---|---|---|
| GB | 1248891 A | | 10/1971 |
| JP | 61-3711 | * | 1/1986 |
| JP | 2001-205634 A | | 7/2001 |
| JP | 2005-81617 | * | 3/2005 |
| WO | 2007/108520 A1 | | 9/2007 |
| WO | WO 2008/065463 | * | 6/2008 |

OTHER PUBLICATIONS

PCT/US2008/068847 International Written Opinion dated Oct. 2, 2008.

JP2001-205634A—English abstract and machine translation obtained from Patent Abstracts of Japan (http://www4.ipdl.inpit.go.jp/Tokujitu/tjsogodbenk.ipdl) accessed on May 9, 2012, 12 pages.

WO2007/108520A1—English abstract and machine translation obtained from Espacenet (http://worldwide,espacenet.com) accessed on May 8, 2012, 12 pages.

JP2005-081617A—English abstract and machine translation obtained from Patent Abstracts of Japan (http://www.19.ipdl.go.jp) accessed on May 8, 2012, 8 pages.

* cited by examiner

TIRE MOLD WITH POSITIVE MOLD OPENING SYSTEM

This application is a National Stage application of International Application No. PCT/US2008/068847, filed Jun. 30, 2008, to which this application claims priority and the benefit of, the disclosure of which is also hereby incorporated by reference.

BACKGROUND OF THE INVENTION

1. Field of the Invention

This invention relates generally to curing molds, and, more specifically, to apparatus for controlling the opening and/or closing of curing molds that may be segmented and/or split-type.

2. Description of the Related Art

Molds for curing objects, such as tires, etc., may comprise a split mold. A split mold generally includes an upper mold portion and a lower mold portion, each of which translate vertically between open and closed positions. Each of the upper and lower portions of the mold may generally be segmented into a plurality of arcuate sections. During or subsequent vertical translation, the sections of the upper and lower portions translate outwardly in a radial direction. The radial translation of the sections facilitates the demolding of the cured object. For example, a tire having a complex tread design may be difficult to demold without the radial portion of the mold translating outwardly, as portions of the mold sections would remain within the molded tread to resist any force attempting to lift the tire vertically from the mold.

Because a split-type and/or segmented mold generally includes a plurality of interoperable mold portions, it is important that the portions collapse inwardly to properly engage adjacent portions of the mold in a closed mold position, to eliminate the formation of any gaps there between. For example, when one or more sections collapse inwardly in a misaligned manner, adjacent portions will not engage properly. This may cause the sections to bind, and edges along the sections to wear or become damaged. The same can occur when the upper and lower mold portions become misaligned. Misaligned or worn edges generally form gaps in the closed mold and reduce the life of the damaged components. Worn edges and gaps results in the formation of flash along associated portions of the cured tire. Flash is rubber that is forced between adjacent plates and segments by pressurization encountered during tire curing processes. Flash results in a loss of rubber, which may be detrimental to the formation and integrity of the corresponding tire. It may also cause misalignment in the tread area, which may prevent the proper formation of intricate tread elements. When the mold is opening, other problems may arise due to misalignment of the segments and/or upper and lower mold portions. For example, the tire may not demold properly, causing tearing or other damage to the tire.

SUMMARY OF THE INVENTION

Particular embodiments of the present invention include a tire curing mold. Particular embodiments of the present invention a tire curing mold including an upper mold portion having a plurality of upper sections radially translatable between open and closed positions and a lower mold portion including a plurality of lower sections radially translatable between open and closed positions, wherein each of the lower sections are positioned adjacent one of the upper sections to form a plurality of pairs of upper and lower sections. The tire mold also includes a pin extending from a first section of each pair of upper and lower sections, and an aperture extending within a second section of each pair of upper and lower sections, the aperture including an opening and positioned for receiving a portion of the pin extending from the corresponding first section when the mold is in a substantially closed position.

Particular embodiments of the present invention include a tire curing mold having a first plurality of sections arranged to form an expandable ring. A portion of the first plurality of sections forms a portion of a tire molding cavity. The sections of the first plurality are radially translatable between open and closed positions and form one or more first pairs of adjacent first sections. The tire mold further includes one or more first synchronization members extending between adjacent sections of each first pair, wherein each first synchronization member extends from one section to slidably engage the other section for each first pair of sections when the first plurality of sections are translating between the open and close positions.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention provide apparatus for controlling the opening and closing of a curing mold, and more specifically, a segmented and/or split-type curing mold.

Figure 1:
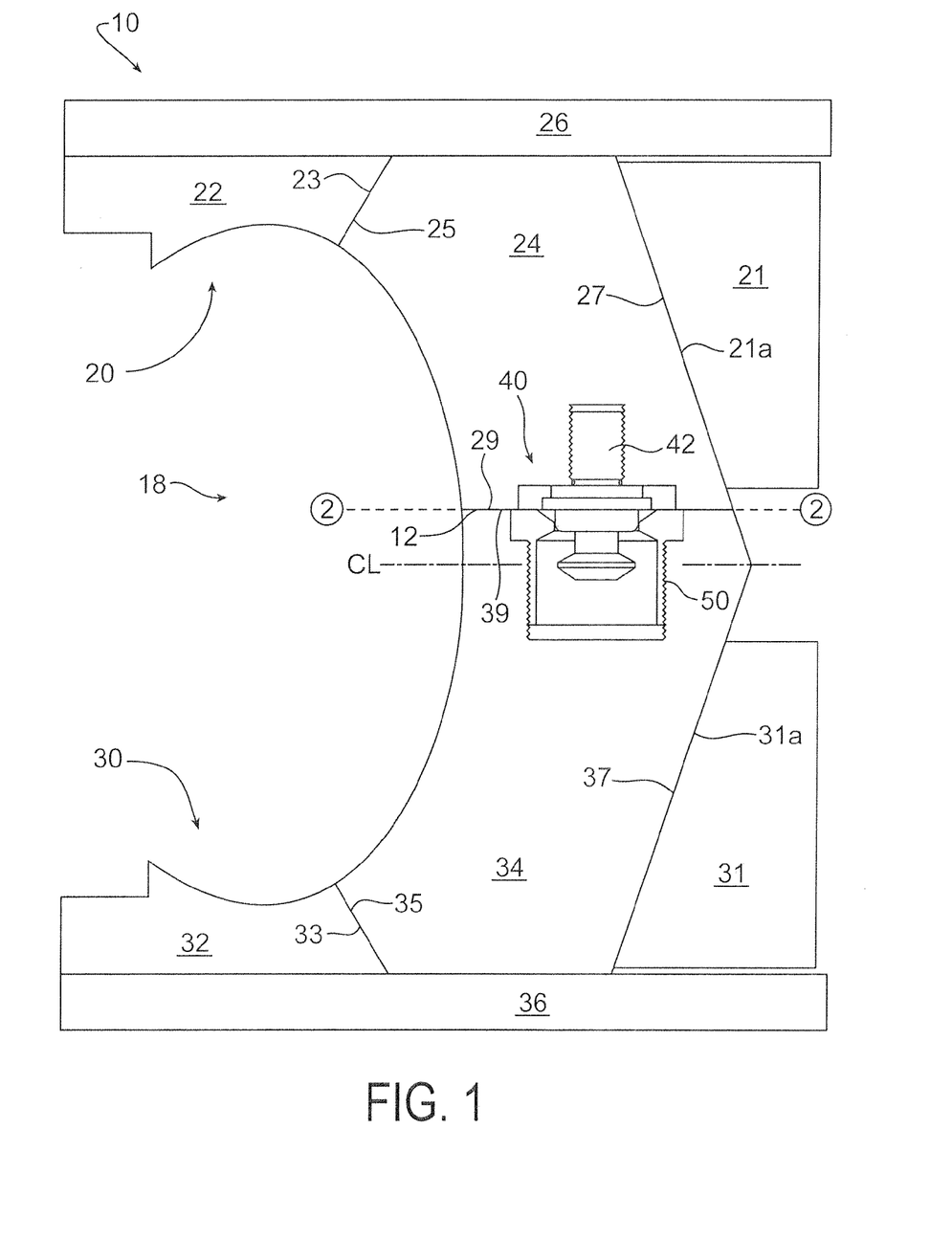
FIG. 1 is a partial sectional side view of a tire curing mold, according to an embodiment of the invention, wherein the pin is shown in a non-sectioned view.

With general reference to FIG. 1, a split-type tire curing mold 10 comprises an upper mold portion 20 and a lower mold portion 30. Each mold portion 20, 30 is generally segmented into a plurality of sections 24, 34 respectively. One or more side plates 22, 32 each form a ring and engage the plurality of sections 24, 34, respectively, to form a tire molding cavity 18, where the side plates 22, 32 are generally associated with a sidewall of the cured tire, and sections 24, 34 are generally associated with the tread area of the cured tire. In particular embodiments, upper mold back 21 and upper side plates 22 are connected to an upper base plate 26, while lower mold back 31 and lower side plates 32 are connected to a lower base plate 36. Upper and lower sections 24, 34 are slidably engaged with each corresponding (adjacent) mold back 21, 31, and are forced upwardly and outwardly toward a mold open position, such as, for example, by a spring. Mold backs 21, 31 retain the plurality of sections 24, 34 in expandable ring-like arrangements, whereby sections 24, 34 slide between open and closed positions along the inclined conical surfaces 21a, 31a of each mold back 21, 31.

A mold opening process is initiated by first vertically raising upper base plate 26, which includes raising upper side plates 22 and mold back 21. As the upper mold back 21 is raised, the surface 27 of upper section 24 translates upwardly (vertically) and outwardly in a radial direction along conical surface 21a of upper mold back 21. As the upper section 24 translates upwardly and outwardly, surface 37 of lower section 34 translates along conical surface 31a of lower mold back 31. This allows upper and lower sections to generally remain in contact between surfaces 29, 39, or along parting line (or plane) 12, while the tire is being demolded from mold 10. This translation continues until sections 24, 34 reach a translational limit, after which the upper mold portion 20 is lifted vertically from lower mold portion 30 to provide access for tire removal. Demolding of the tire can become difficult, such as when any of the mold components become misaligned or tilted relative to other components, and/or when more complex and/or intricate tread designs resist demolding (i.e., resist separation from a section 24, 34).

Figure 2:
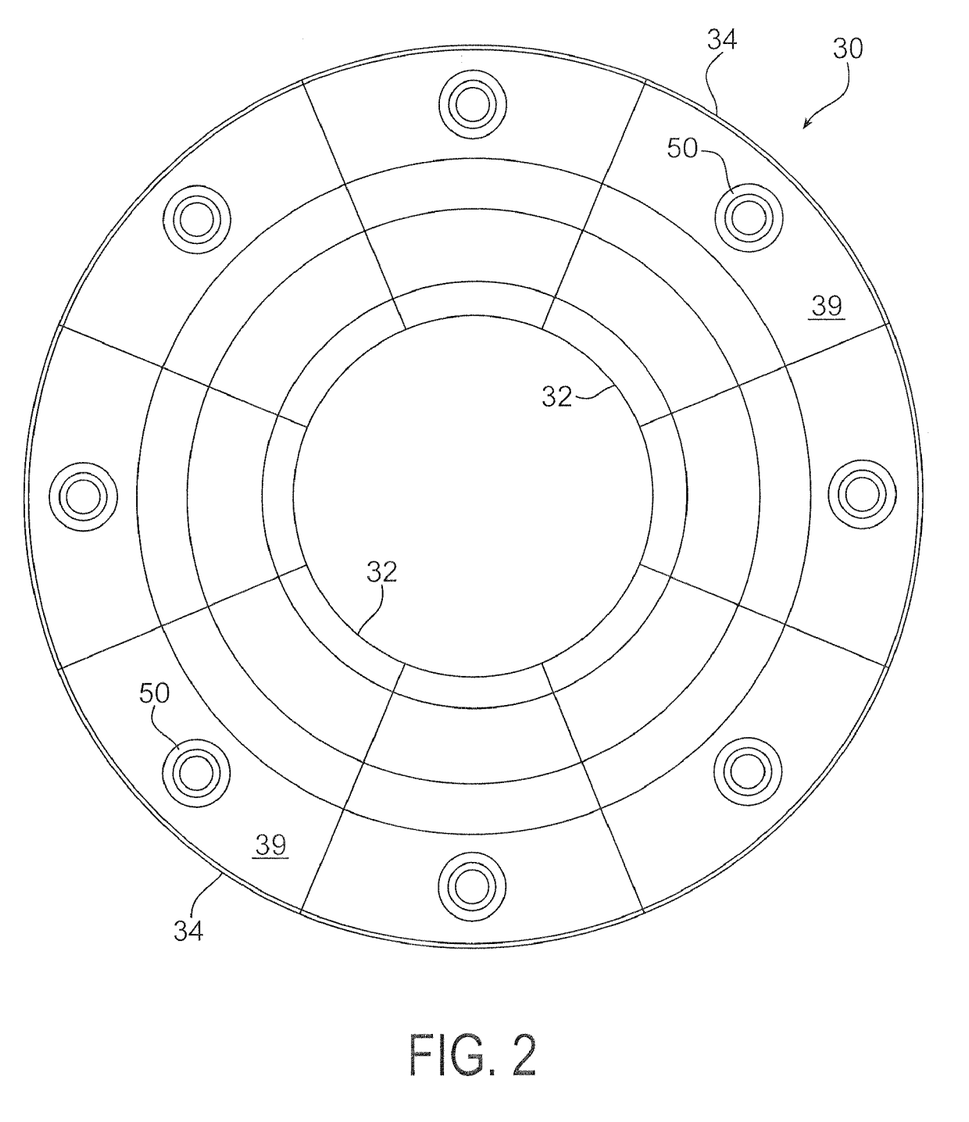
FIG. 2 is a sectional top view of the mold shown in FIG. 1, along line 2-2.

During a mold closing operation, closing forces are transmitted through upper base plate 26. Upper base plate 26 forces upper sections 24 into contact with lower sections 34 along surfaces 29, 39, and upper mold back 21 vertically downward, thereby directing sections 24 radially inward and downward, while also directing sections 34 downward and inward along bold back 31. The radial translation causes upper sections 24 to engage corresponding side plates 22 along surfaces 23, 25, and lower sections 34 to engage corresponding side plates 32 along surfaces 33, 35. Concurrently, sections 24, 34 engage the side surfaces of adjacent sections 24, 34 to form an upper and lower annulus of upper sections 24 and lower sections 34, respectively (shown in generally in FIG. 2). After mold 10 is closed about a green tire, the mold is internally pressurized to force the green tire against the surfaces of inner tire molding cavity 18.

Accordingly, a plurality of pin-aperture assemblies 40 may be used to resist, overcome, or otherwise alleviate the difficulties discussed above. With general reference to FIGS. 1-6, each pin-aperture combination 40 operates between adjacent pairs of sections 24, 34, whereby a pin 42 extends from a cavity 28, located within one of the upper and lower sections 24, 34, to engage an aperture 50 located within the other of the sections 24, 34. The pin-aperture combination 40 facilitates proper mold opening by generally maintaining radial alignment between adjacent sections 24, 34. More specifically, pin-aperture combination 40 maintains synchronized translation between upper and lower sections 24, 34 to reduce damage to the tire that may result from shearing and other forces generated during asynchronous translation of sections 24, 34. Pin-aperture combination 40 also transfers opening forces ($F_V$ and $F_R$) to lower section 34 to assist in the demolding of lower section 34 from any resistive tire tread. Pin-aperture combination 40 also facilitates proper alignment between upper and lower mold portions 20, 30 during mold closure, thereby preventing/reducing damage to any mold components thereof that may arise due to misaligned engagement of such components. This also ensures that the same components properly seal tire cavity 18 to prevent/reduce the occurrence of flash along the tire (i.e., rubber expelled from the tire cavity, which results in waste and may affect tire integrity), and that the components are properly arranged to correctly form any desired features along the tire tread area and any other portion of the tire. In particular embodiments, at least one pin-aperture combination 40 is provided for each pair of sections 24, 34. With specific reference to the embodiment shown in FIG. 2, an aperture 50 is formed in each surface 39 for use with pins 42 (positioned in adjacent upper sections 24) to form corresponding pin-aperture combinations 40.

With general reference to FIGS. 1-6, each pin-aperture combination 40 includes a pin 42 and an aperture 50, each extending from one of the parting line surfaces 29, 39 of upper and lower section 24, 34, respectively. Generally, pin 42 closely fits within aperture 50 to properly maintain upper and lower sections 24, 34 in alignment during mold opening by transferring opening forces ($F_V$ and $F_R$) to bottom section 34 to assist in tire demolding, and radially synchronizing the translation of upper and lower sections 24, 34 during opening and closing operations. In the embodiments shown, pin 42 extends from surface 29 of upper section 24 into aperture 50, which extends within lower section 34. Still, it is contemplated that pin 42 may extend from lower section 34, and aperture 50 from upper section 24. It is contemplated that pin 42 may include any shaped cross-section, such as, for example, a circular or square cross-section. Further, over the length of pin 42, the cross-section may be substantially constant, to provide a generally straight pin, which may form, for example, a cylinder or the like. In other embodiments, such as those shown in the FIGURES, the cross-section may vary as desired to provide a contoured pin 42, which may include, for example, tapers, recesses, ridges, or cavities positioned along the exterior surface of pin 42. It is also contemplated that pin 42 may be formed of any known material, such as, for example, steel, aluminum, or any alloy thereof.

Figure 3:
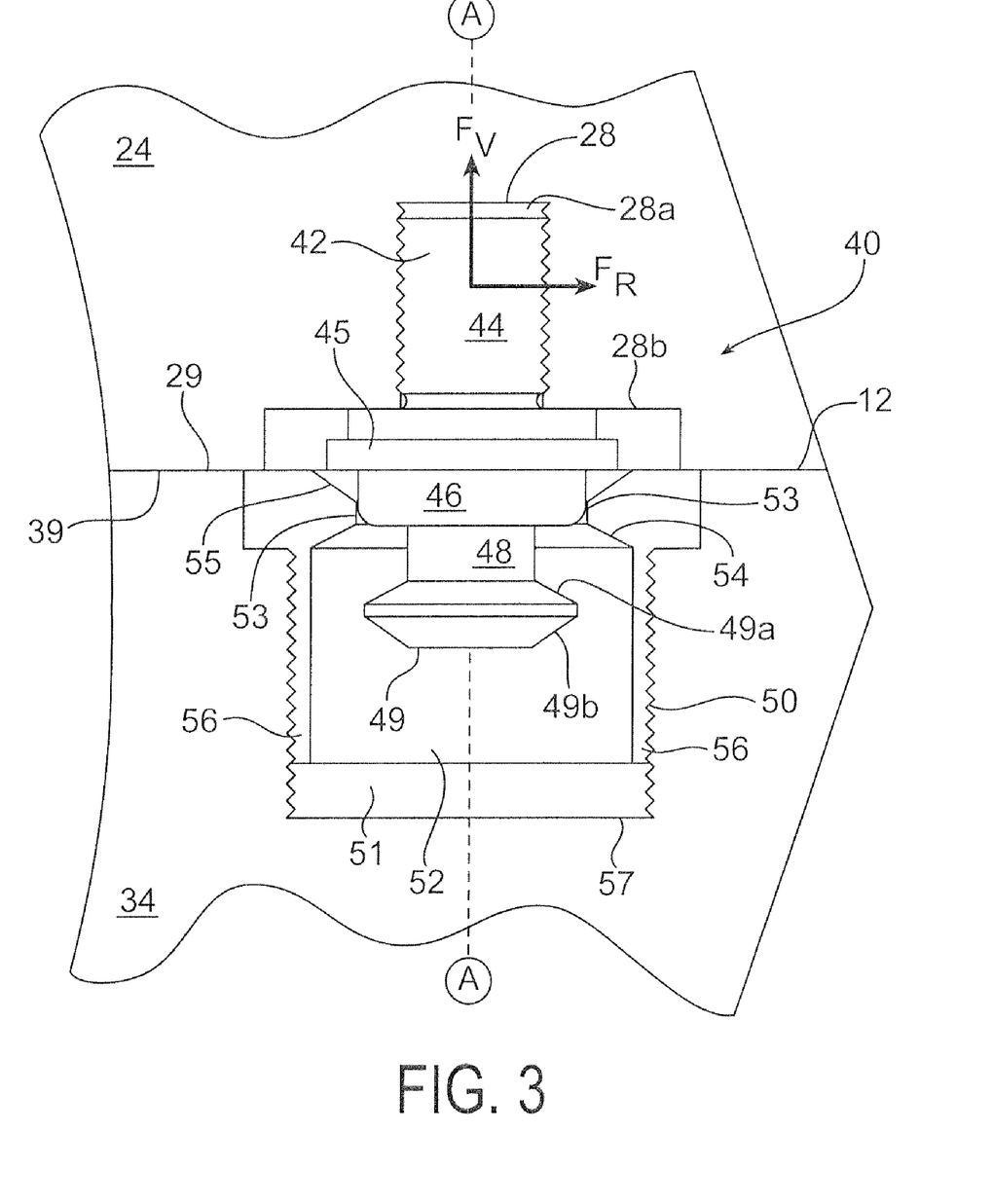
FIG. 3 is an enlarged partial sectional side view of the pin-aperture combination of the mold shown in FIG. 1.

In particular embodiments, pin 42 may generally include an alignment portion 46 that closely fits within an opening 53 of aperture 50. Alignment portion 46 comprises one or more exterior surfaces of pin 42 for interacting with opening 53. In one embodiment, alignment portion 46 is sized to closely approximate the size of (i.e., the innermost extent of) opening 53, which may include a small gap existing between the pin 42 and opening 53. The small gap may account for any manufacturing imperfections or differences in expansion between the components, and/or may provide additional space for easier alignment and insertion of pin 42 into opening 53. Alignment portion 46 may transfer radial opening and closing forces ($F_R$) from the upper mold section 24 to the lower mold section 34, and may align the upper and lower sections 24, 34 when alignment portion 46 is positioned within opening 53 when mold 10 is in a closed position, which is shown in FIGS. 1 and 3 in a particular embodiment. Alignment of upper and lower sections 24, 34 facilitates proper alignment and engagement of sections 24, 34 with adjacent sections 24, 34, which also facilitates proper engagement with adjacent side plates 22, 32 for the purpose of reducing/eliminating damage to the edges of sections 24, 34 and side plates 22, 32. Alignment of sections 24, 34 also reduces/eliminates the formation of flash that may arise from misalignment and wear, and facilitates proper formation of tread elements and other tire surface features.

Pin 42 may also include an attachment portion 44 for securing pin 42 to a corresponding section 24, 34. Pin attachment portion 44 generally facilitates securement of pin 42 within a corresponding mold section 24, 34. In various embodiments, pin 42 may be secured to a corresponding mold section 24, 34 by any known method, which includes welding or use of any known fastener, such as a bolt, adhesive, or interference fit. A fastener may extend axially through at least a portion of pin 42, or may extend through one or more flanges extending from a side of pin 42, in similar fashion to the bolts and flanges shown in FIG. 6 in association with an alternative embodiment of aperture 50. Accordingly, attachment portion 44 may comprise a surface of pin 42, such as for welding or threaded attachment. In the embodiments shown in FIGS. 1-6, pin 42 includes an attachment portion 44 that extends into mold section 24, the attachment portion having threaded sides 44a for securing attachment portion 44 within a cavity, such as a corresponding sub-cavity 28a, which is located within corresponding mold section 24. Accordingly, one or more surfaces 45 may be provided for applying torque or other forces for securing attachment portion 44 within sub-cavity 28a. In the embodiment shown, portion 44 comprises a hexagonal cross-section having a plurality of exterior surfaces for engaging a tool or other device to rotatably secure attachment portion 44 within section mold 24. Securement surfaces 45 may be contained within cavity 28, and more specifically, within sub-cavity 28b.

Figure 4:
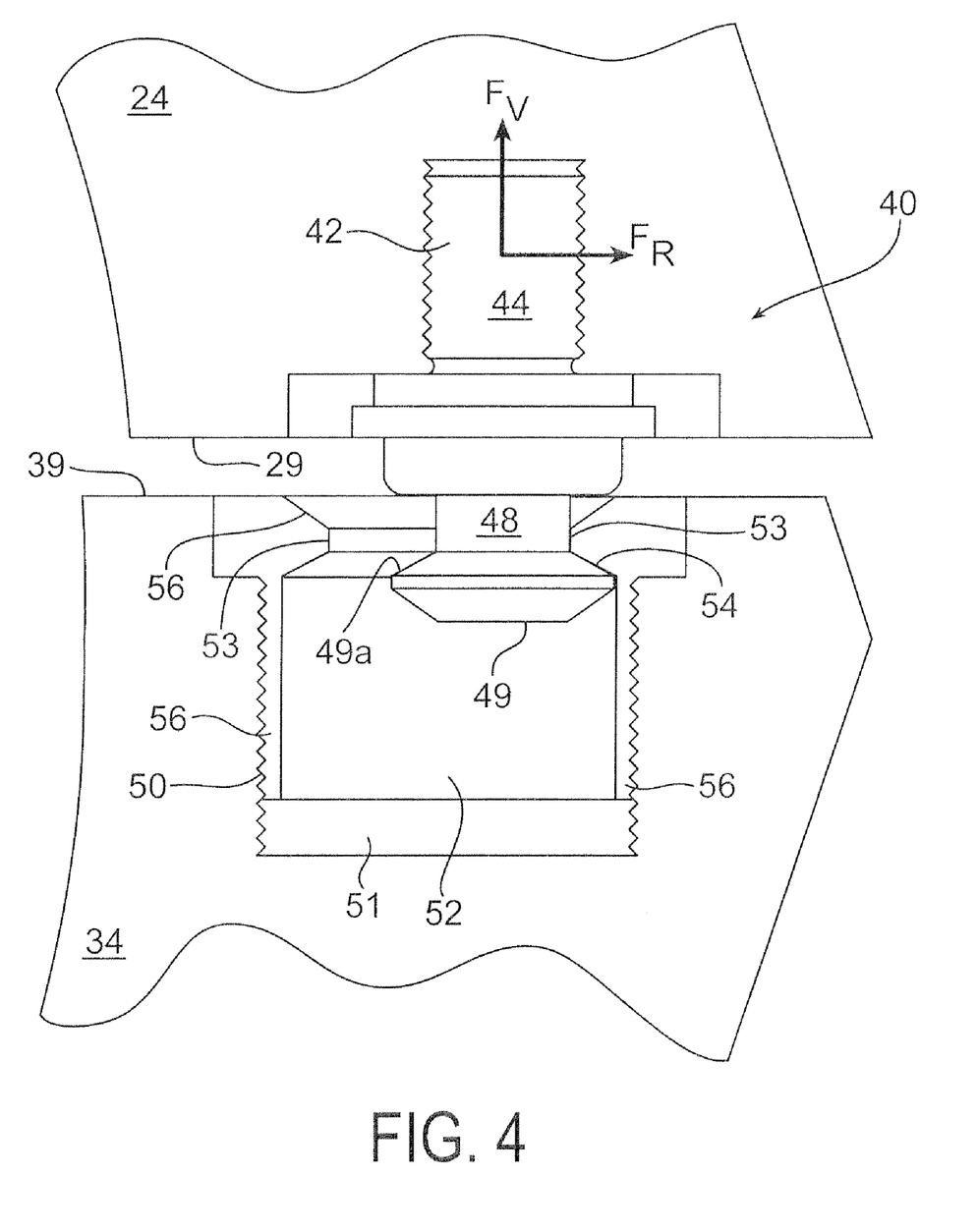
FIG. 4 is an enlarged sectional side view of the pin-aperture combination of the mold shown in FIG. 3, showing the upper mold portion and pin translating during a mold opening operation relative to the lower mold portion and the aperture contained therein.

In particular embodiments, pin 42 may include a ridge 49 for engaging a ledge 54, which may or may not be formed in association with opening 53. As shown in the FIGURES, in a particular embodiment, ledge 54 is formed in association with inwardly extending opening 53. As pin 42 is raised by operation of the mold opening forces, radial opening forces $F_R$ may be transferred from alignment portion 46 to opening 53, as generally shown in FIG. 3. However, alignment portion 46 may become disengaged from opening 53. If disengagement occurs, ridge 49 is provided to regain pin engagement with opening 53, as generally shown in FIG. 4. Disengagement may result, for example, when lower mold section 34 will not release (i.e., demold) from the tire. Therefore, ridge 49 may transmit vertical $F_V$ as well as radial opening forces $F_R$ to lower mold section 34 by way of ledge 54, as shown in FIG. 4 in a particular embodiment. Ridge 49 may include a surface 49a for engaging ledge 54. In particular embodiment shown in the FIGURES, ridge surface 49a and ledge 54 may form similarly-contoured and similarly arranged interoperable surfaces to maximize contact during engagement. It is contemplated that either ridge 49 or ledge 54 may instead form a recess, wherein the other of the ridge 49 or ledge 54 may extend during engagement. Once the upper and lower mold sections 24, 34 reach the extent of their translation along respective mold backs 21, 31, pin 42 is re-centered within aperture 50, during which ridge 49 and ledge 54 disengage, before pin 42 is lifted vertically from aperture 50. It is contemplated that ridge 49 may be located at an end of pin 42, as shown in the FIGURES, or at any other location along the length of pin 42. In particular embodiments, an extension 48 may extend between ridge 49 and alignment portion 46, which may be used to engage opening 53 when ridge 49 is engaged with ledge 54.

In particular embodiments, pin 42 includes a tapered bottom surface 49b, which is located at the distal end of pin 42 for the purpose of assisting with the repositioning of pin 42 within aperture 50 during mold closure operations. In particular embodiments, tapered bottom surface 49b is located in association with ridge 49, as shown in the FIGURES, although this association may not exist in other embodiments.

With continued reference to FIGS. 1-6, aperture 50 generally extends within a mold section 24, 34. In particular embodiments, aperture 50 forms an aperture cavity 51 extending within any such section 24, 34. In other embodiments, such as those shown in the FIGURES, aperture 50 forms an insert 52 that is placed within aperture cavity 51. Likewise, any feature discussed in association with aperture 50 may be formed in association with aperture cavity 51 or with insert 52. Therefore, in the discussions herein, when referencing aperture 50, cavity 51 and insert 52 are also referenced and contemplated. As shown in the FIGURES, aperture forms an insert 52 placed and secured within aperture cavity 51. An insert 52 may be placed within cavity 51 and used to interact with pin 42, such as when it is desired that a material other than the corresponding section 24, 34 material be used to interact with pin 42. For example, when section 24, 34 is made of aluminum, it may be desired to use an insert 52 formed of steel. It may also be desirous to utilize an insert 52, which may be easier to manufacture in lieu of forming cavity 51 to achieve the desired features of aperture 50. Cavity 51 and insert 52, and any features thereof, may be formed by any known method, such as by machining, molding, or casting. Insert 52 may be secured within aperture cavity 51 by any known means, such as, for example, by a threaded portion, fasteners, adhesive, or welding.

In particular embodiments, with reference to FIGS. 1-5, an insert 52 may form a sleeve-like structure, having an opening 53 extending from downwardly extending sidewalls 56. With reference to FIG. 6, it is also contemplated that insert 52 may form a ring-like structure, which generally does not include sidewalls 56 extending downwardly from opening 53. The ring-like insert 52 may be secured within aperture cavity 51 by any means discussed above in general association with insert 52, such as by threading (as shown with regard to other embodiments of insert 52 in FIGS. 1-5) or fasteners, as shown in FIG. 6. In the embodiment shown in FIG. 6, the sidewall thickness of insert 52 is extended to form a tab 59, through which fasteners 59a are able to extend to secure insert 52 into section 34. In other embodiments, it is contemplated that any insert 52 may be formed from one or more interoperable components.

As mentioned above, aperture 50 generally includes an opening 53. In the embodiment shown in the FIGURES, opening 53 forms a portion of insert 52, which is positioned within aperture 50 for receiving pin 42. Opening 53 may extend inwardly from a side of aperture 50 at any location along the length of aperture 50 (i.e., cavity 51 or insert 52), as shown in the FIGURES in particular embodiments, or it may simply comprise a top surface of the aperture. Aperture 50 may also include an inwardly tapered surface 55 to assist in positioning pin 42 within opening 53 during mold closing operations. Tapered surface 55 may be located along a top surface of aperture 50, or may be located along a top surface of opening 53, as shown in the FIGURES in particular embodiments.

As mentioned above, aperture 50 may also include a ledge 54. Ledge 54 provides a surface that interoperates with ridge 49 formed along pin 42. Ledge 54 may be formed along any portion of aperture 50, such as, for example, as part of opening 53, which is shown in the FIGURES in particular embodiments, where a ledge is provided in association with an inwardly extending opening 53. It is contemplated it may be positioned in any other desirable location along the length of aperture 50. Ledge 54 generally extends inwardly into aperture 50. In the embodiments shown in the FIGURES, ledge 54 extends inwardly from a sidewall 56 of aperture 50, and more specifically, insert 52. However, it is contemplated that ledge 54 may reside within a recess positioned outwardly of sidewall 56 and extend inwardly toward sidewall 56 of aperture 50.

Figure 5:
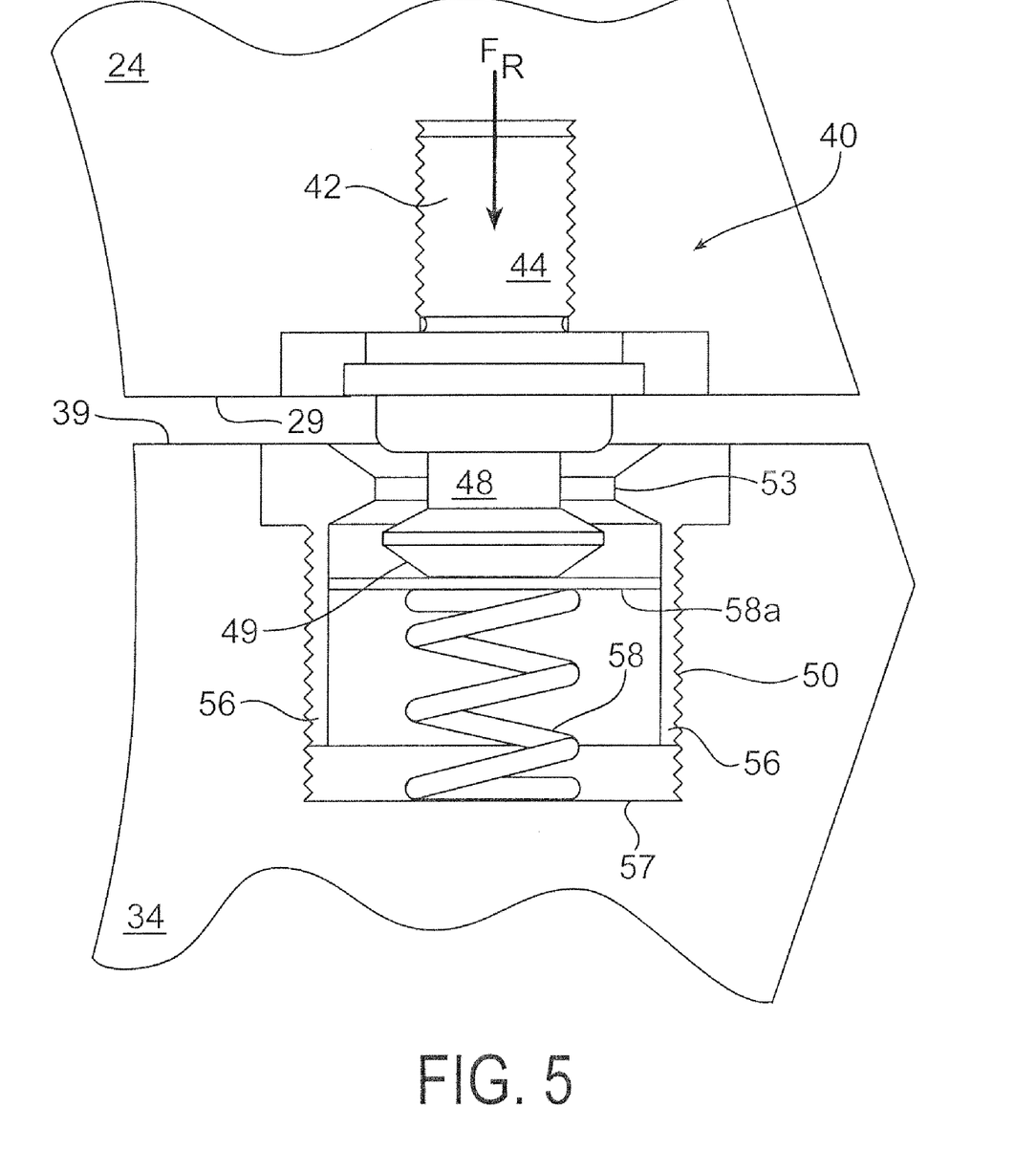
FIG. 5 is an enlarged sectional side view of the pin-aperture combination of the mold shown in FIG. 3, in another embodiment, showing the lower mold portion being received by the lower mold portion in a controlled manner by use of a compressible member (shown in a non-sectioned view).
Figure 6:
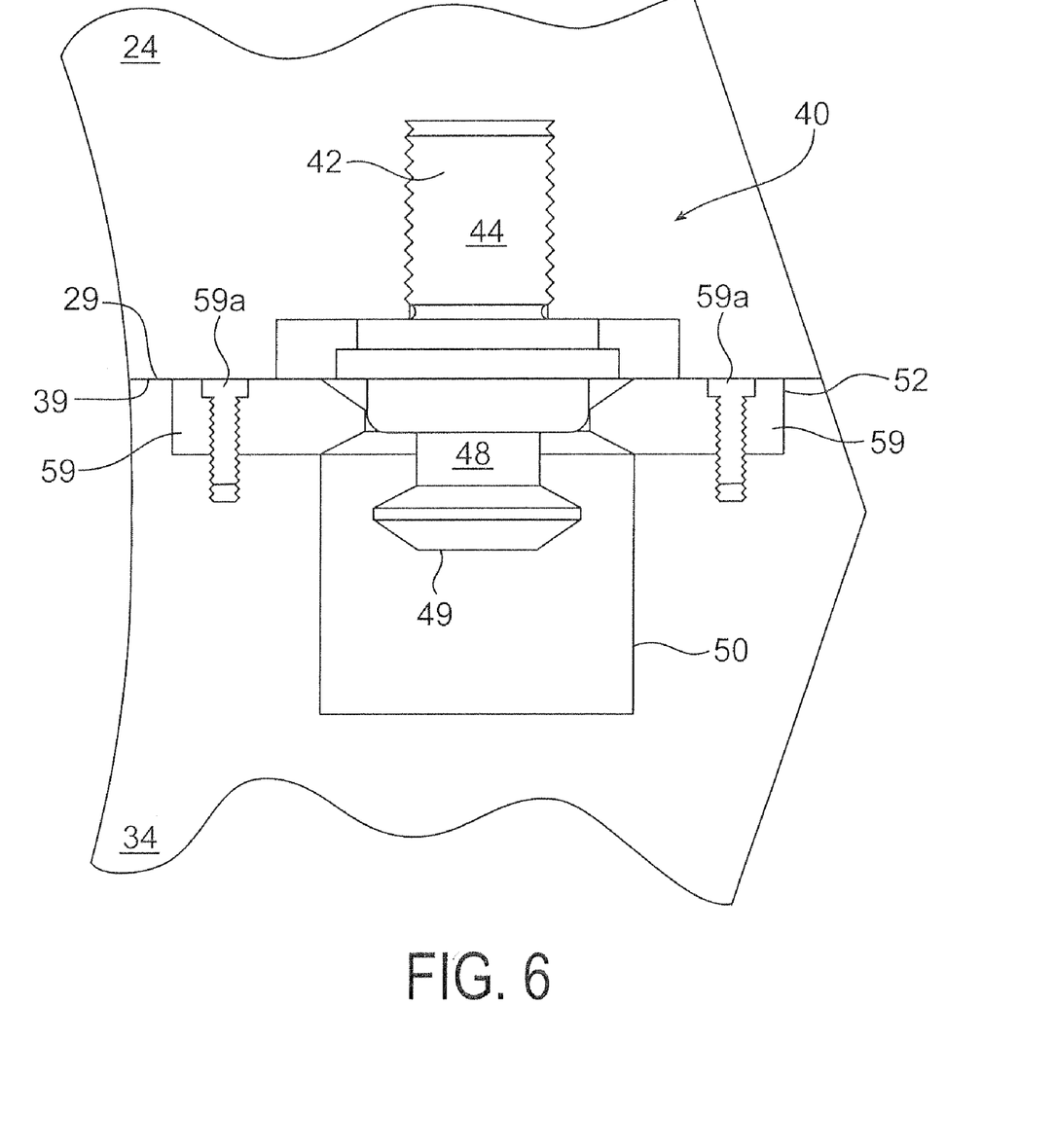
FIG. 6 is an enlarged sectional side view of an alternative embodiment of the pin-aperture combination of the mold shown in FIG. 3.
Figure 7:
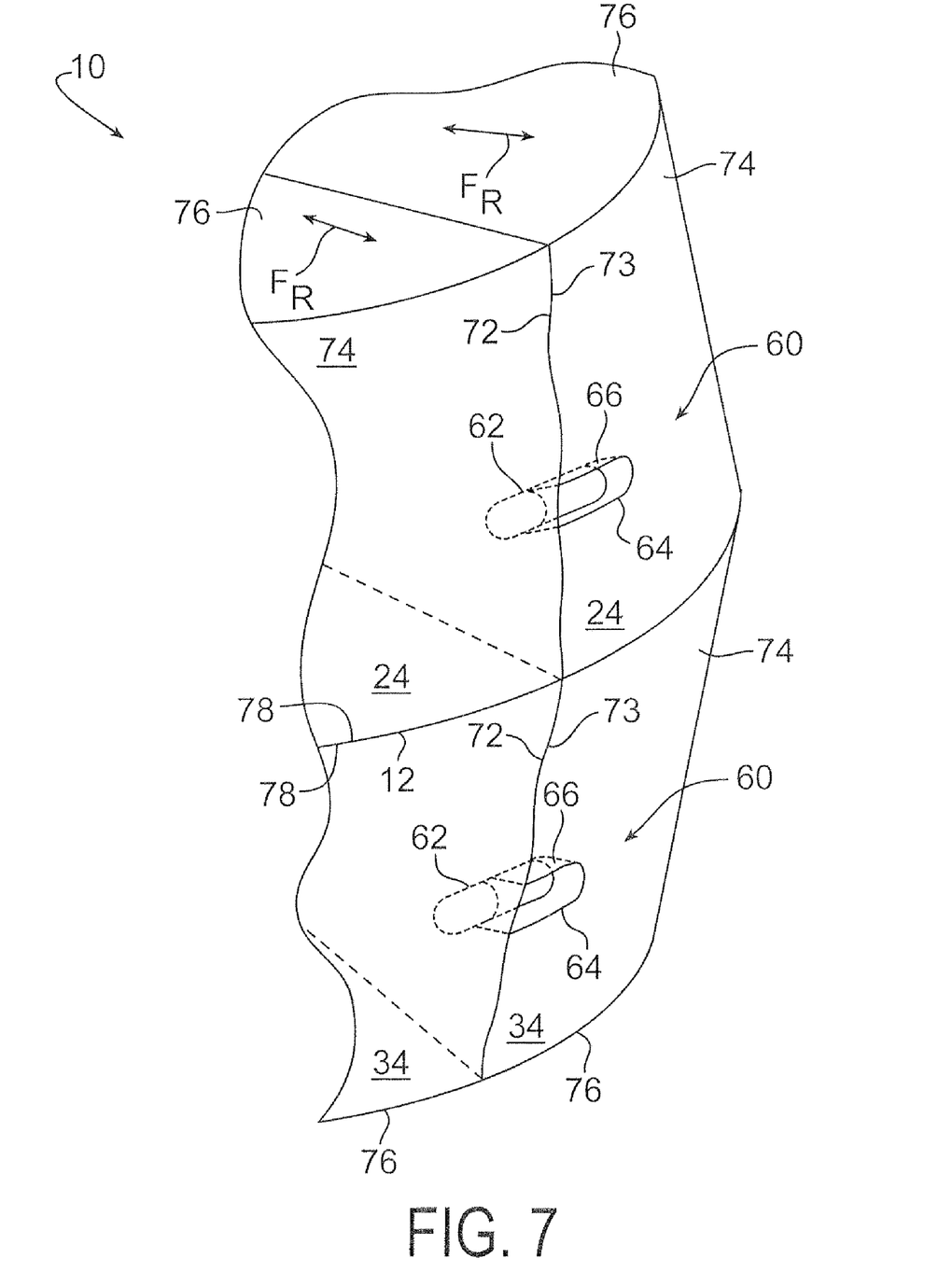
FIG. 7 is a side perspective view of an external portion of the upper and lower mold portions, in accordance with another embodiment of the invention, showing a synchronization member extending from one mold section to a synchronization member-receiving cavity in an adjacent mold section.
Figure 8:
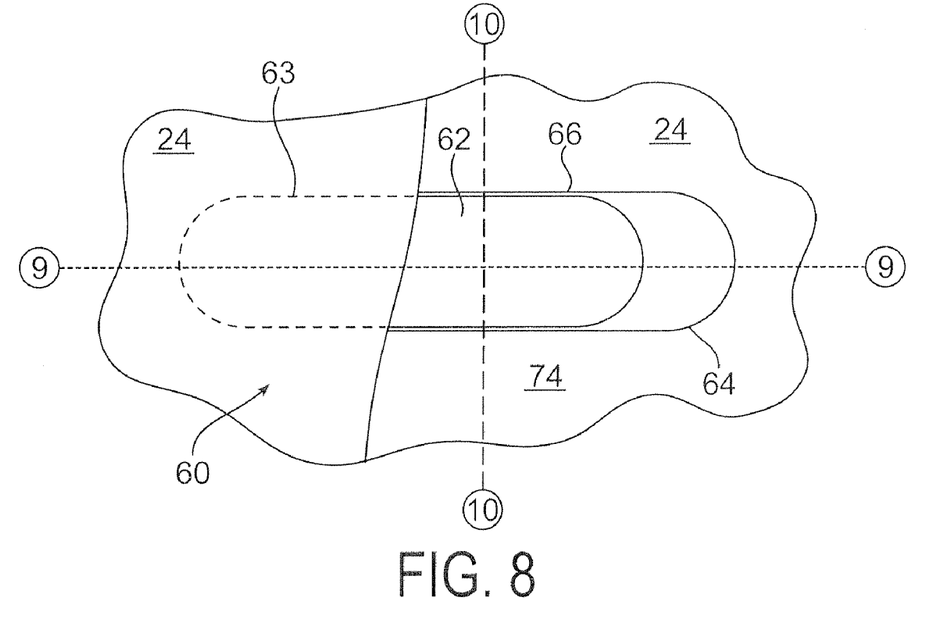
FIG. 8 is an enlarged side view of the synchronization member and member-receiving cavity shown in FIG. 7.

In particular embodiments, such as shown in FIG. 5, mold 10 may include a compressible member 58 that is capable of controlling the collapse of a penetrating pin 42. Compressible member 58 controls the relative translation between upper and lower sections 24, 34 as each approaches engagement along parting line 12. In certain embodiments, aperture 50 includes a compressible member 58 that extends a height between aperture opening 53 and a bottom 57 of aperture 50. In various embodiments, a plate 58a may extend along a top portion of compressible member 58 to provide a more uniform engagement between pin 42 and compressible member 58. Compressible member 58 may comprise any spring, which includes a coil spring, leaf spring, or rubber disk, or any other component capable of controlling the downward translation of pin 42, such as, for example, a piston or cylinder. In operation, each pin 42 is inserted into a corresponding aperture 50, and initially engages corresponding compressible members 58 in an extended orientation.

One purpose of placing compressible members 58 within the plurality of apertures 50 is to synchronize the closing of sections 24, 34 upon each other as each approaches parting line 12. This promotes proper alignment of sections 24, 34 and a more uniform abutment of sections 24, 34 along parting line 12. Therefore, if one or more sections 24, 34 prematurely contact a compressible member 58 prior to other sections 24, 34, the compressible member 58 resists further substantial compression until a substantial quantity of pins 42 contact corresponding compressible members around mold 10. Once a substantial quantity of pins 42 are engaged, the corresponding sections 24, 34 uniformly translate toward the other section 24, 34 while compressing the compressible member 58 toward a mold closed position. Accordingly, compressible member 58 is compressed when the mold is in a closed position. During mold opening operations, compressible members 58 may assist in separating sections 24, 34 toward an open position.

With reference to FIGS. 7-12, various embodiments of the present invention provide a alignment combination 60 that may be utilized by mold 10 to alleviate the difficulties encountered during mold opening and closing processes. In the particular embodiment shown, combination 60 may be used to maintain vertical (and/or horizontal) alignment between each adjacent pair of upper mold sections 24, and between each adjacent pair of lower mold sections 34 during mold opening and closing operations. It is contemplated that mold 10 may be arranged in other relations to the ground plane, and therefore, the alignment maintained may be other than vertical or horizontal. In the embodiment shown, each combination 60 includes a synchronization member 62 that extends from a first side surface 72 of a section 24, 34 and into a synchronization member-receiving cavity 64 located in a second side surface 73 of an adjacent section 24, 34. In operation, members 62 may slide along an upper surface 66 of a corresponding cavity 64 during mold opening and closing operations to prevent adjacent sections from becoming misaligned. This engagement between member 62 and cavity 64 resists any vertical misalignment that may result due to gravity or other misalignments or wear within mold 10 that would cause one of the laterally adjacent sections 24, 34 to seek a lower vertical position relative to the other section 24, 34. In particular embodiments, the combination 60 of member 62 and cavity 64 maintains laterally adjacent sections 24, 34 within 1-2 millimeters (mm) of vertical misalignment. It is contemplated that member-receiving cavity 64 may not exist, and instead synchronization members 62 may engage other surfaces, such as an end surface 76 or a parting line surface 78. In particular embodiments, synchronization members 62 extend substantially parallel to the mold centerline CL (which is parallel to mold parting line 12 in the FIGURES); however, member 62 may extend in any other direction as desired. Cavity 64 may also extend radially outward from an interior surface, which may be substantially parallel to the mold centerline or at any desirous angle relative to the mold centerline CL (as shown exemplarily in the FIGURES). The angled extension of cavity 64 may be desired to account for a multidirectional translation of sections 24, 34 during opening and closing operations.

Synchronization member 62 is generally defined by length $L_M$, and extends into cavity 64 by a length $L_{M,E}$ when in a closed position. In one embodiment, member 62 is 10 mm in diameter, and has a length $L_M$ of at least approximately 2.5 to 4 inches (63.5 to 102 mm). Other lengths $L_M$ may be used, whether larger or smaller, which may depend on the material used. In the present embodiment, the material is formed of steel, although other materials, such as aluminum, may be used. Member-receiving cavity 64 extends a length $L_C$, which is sized to accommodate the extension length $L_{M,E}$ of member 62 when corresponding sections 24, 34 are in the closed (engaged) position. Member 62 may be arranged to extend within cavity 64 at any radial depth $D_C$ of cavity 64. Accordingly, offsets Δ may exist between synchronization member 62 and the inward and/or outward radial extents of cavity 64, when corresponding sections 24, 34 are in a closed position.

Figure 9:
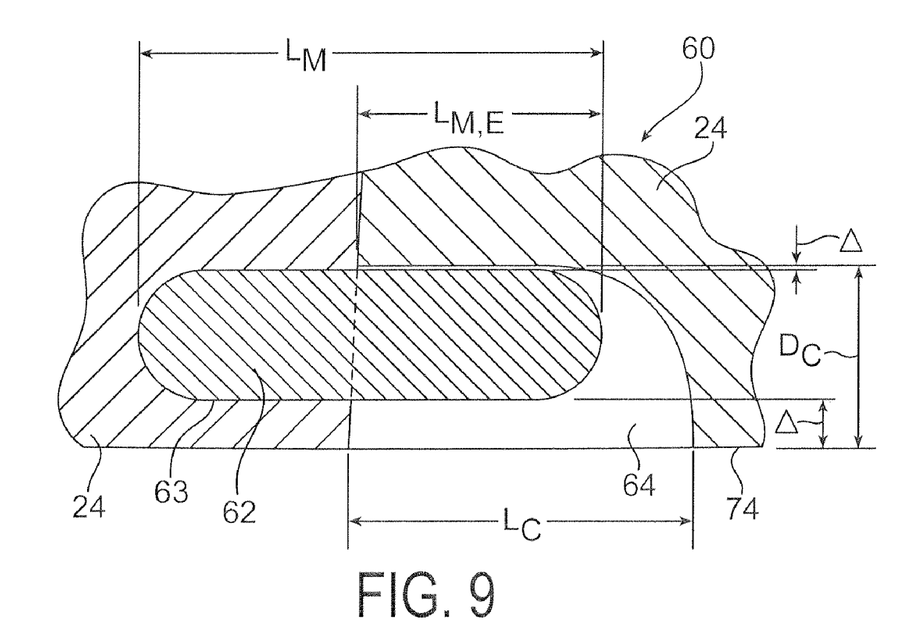
FIG. 9 is a top sectional view of the synchronization member and member-receiving cavity shown in FIG. 8, along line 9-9.
Figure 10:
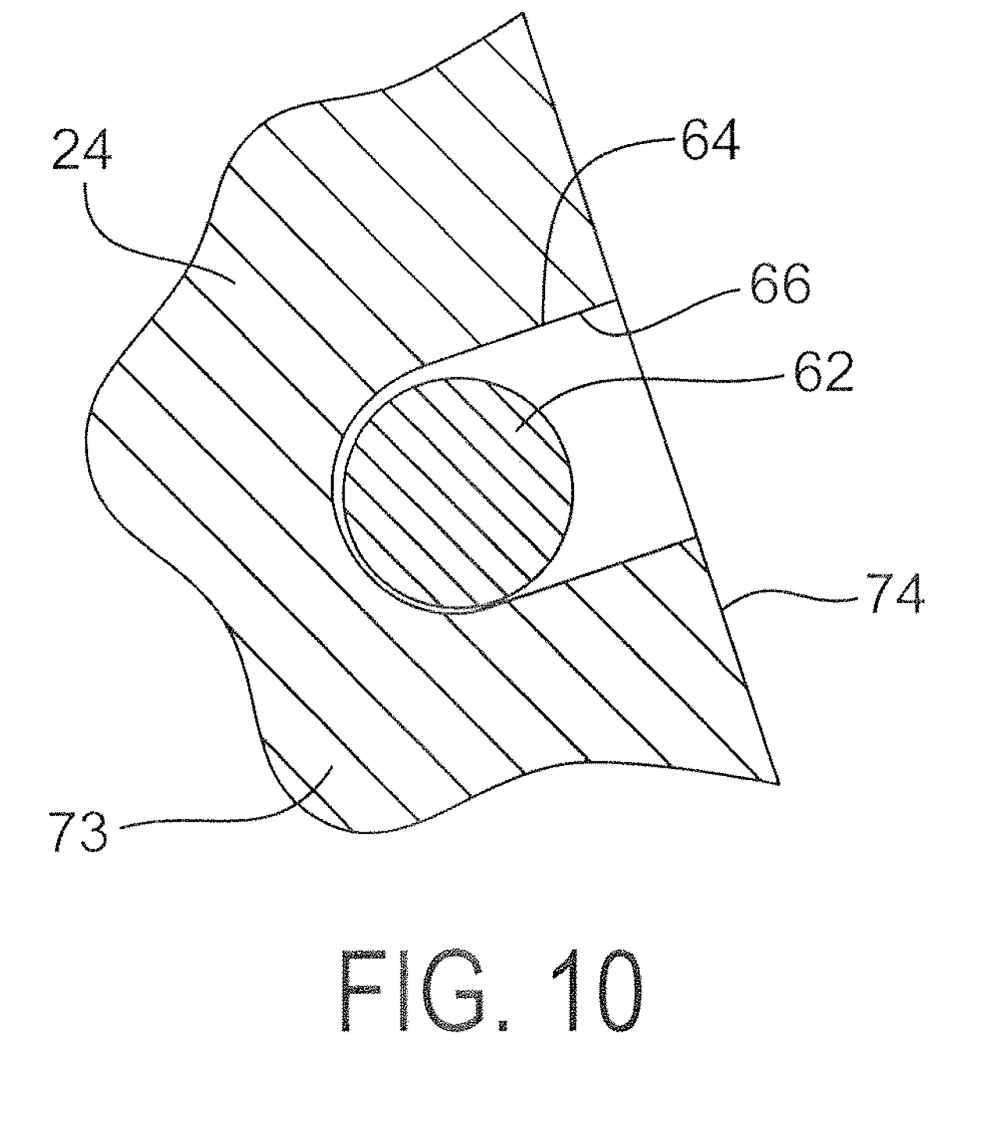
FIG. 10 is a cross-sectional view of the synchronization member and member-receiving cavity shown in FIG. 8, along line 10-10.
Figure 11:
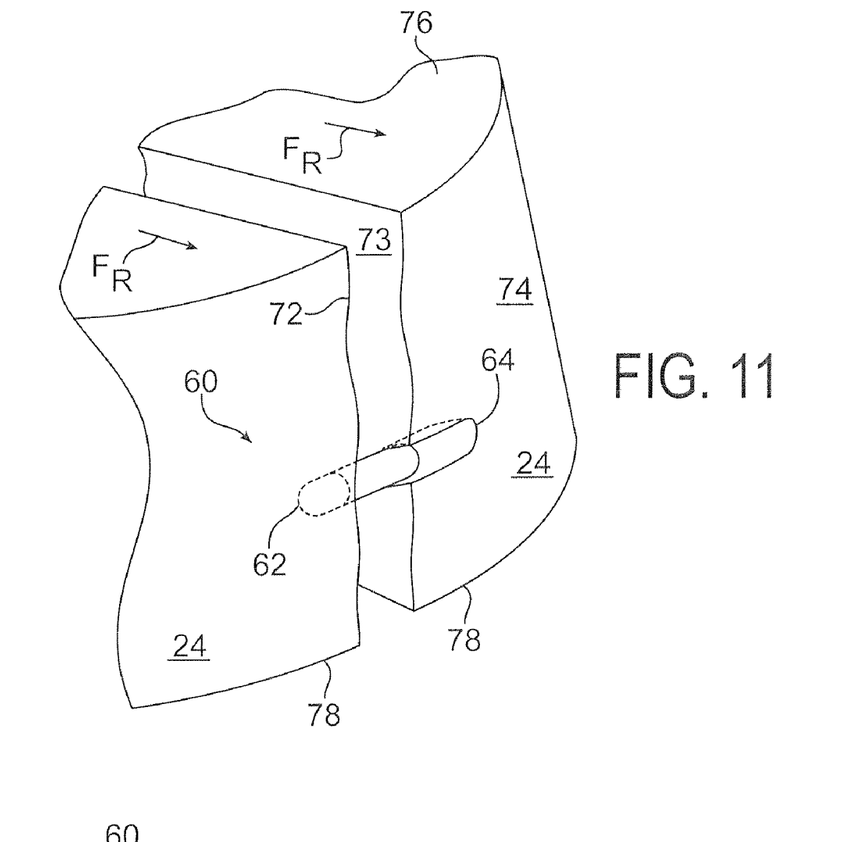
FIG. 11 is a top perspective view of the upper mold portion of FIG. 7 translating between closed and open positions.
Figure 12:
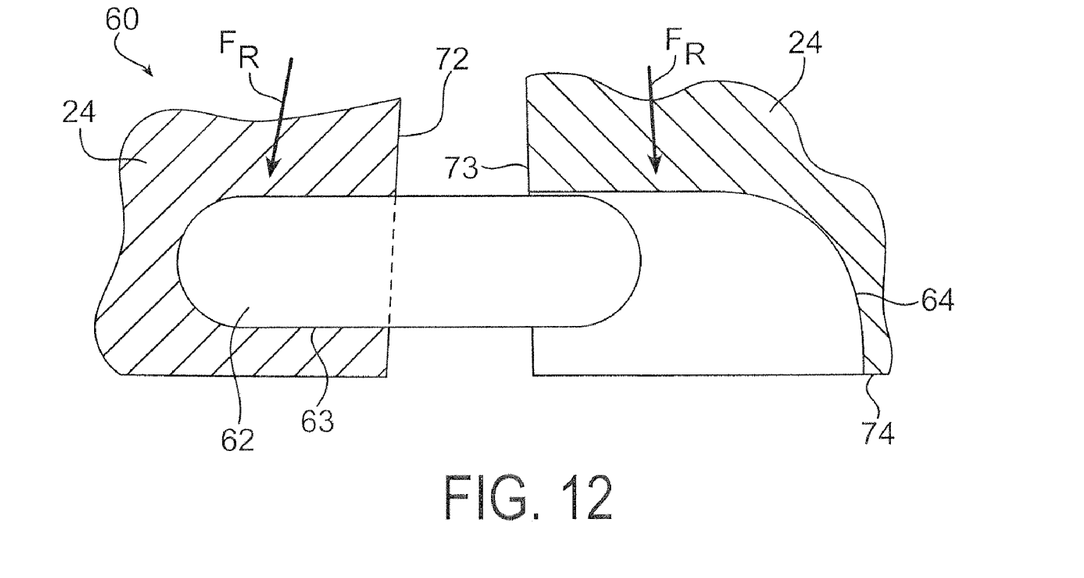
FIG. 12 is a top sectional view taken along 9-9 of FIG. 7, while the mold sections are translating between closed and open positions, as shown in FIG. 11.

In the embodiment shown in FIG. 9, an offset Δ is provided along an outer extent of member 62, between the outer extent of member 62 and the outer radial extent of cavity 64 along depth $D_C$. As suggested above, a second offset Δ could be included along an inner side of member 62, between the inner extent of member 62 and the inner radial extent of cavity 64 along depth $D_C$. Offsets Δ provide a buffer if the corresponding sections 24, 34 become radially misaligned. If offsets Δ were not present, member 62 may extend beyond section outer surface 74, which could interfere with other mold components, such as mold backs 21, 31. Member 62 may also be offset from the radial inner extent of cavity 64, to account for any manufacturing inaccuracies. Otherwise, member 62 may prevent proper radial alignment if it were positioned too far in a radially inward direction. FIGS. 11 and 12 generally show a pair of sections 24 radially translating during a mold opening operation by operation of radial forces $F_R$. In the FIGURES, sections 24 are radially translating in a synchronized manner, where the offset Δ shown in FIG. 9 is not generally consumed by member 62.

It is contemplated that synchronization members 62 may comprise any structural member, such as a bar, pin, or tube, that extends from side 61 of a section 24, 34, into which member 62 is secured. Members 62 may be formed of any desired material, such as aluminum or steel, which may or may not be the same material used to form corresponding sections 24, 34. Member 62 may be placed and/or secured into each section 24, 34 by any known means, such as by way of a threaded portion (as shown in the FIGURES), interference fit, a fastener, an adhesive, or welding. In various embodiments, the pin placed into a member-mounting cavity 63 without securement thereto. The corresponding member-receiving cavity 64 is located adjacent member 62, and may be positioned along any portion of second side surface 73. In particular embodiments, as shown in the FIGURES, member-receiving cavity 64 is located along an outer end surface 74 of the associated section 24, 34. It is contemplated that synchronization members 62 may or may not be used in cooperation with pin-aperture combinations 40, discussed above. It is also contemplated that synchronization members 62, of any embodiment discussed or contemplated, may not be limited for use in split-type molds, as non-split molds may equally benefit from the use of synchronization members 62 and member-receiving cavities 64.

Figure 13:
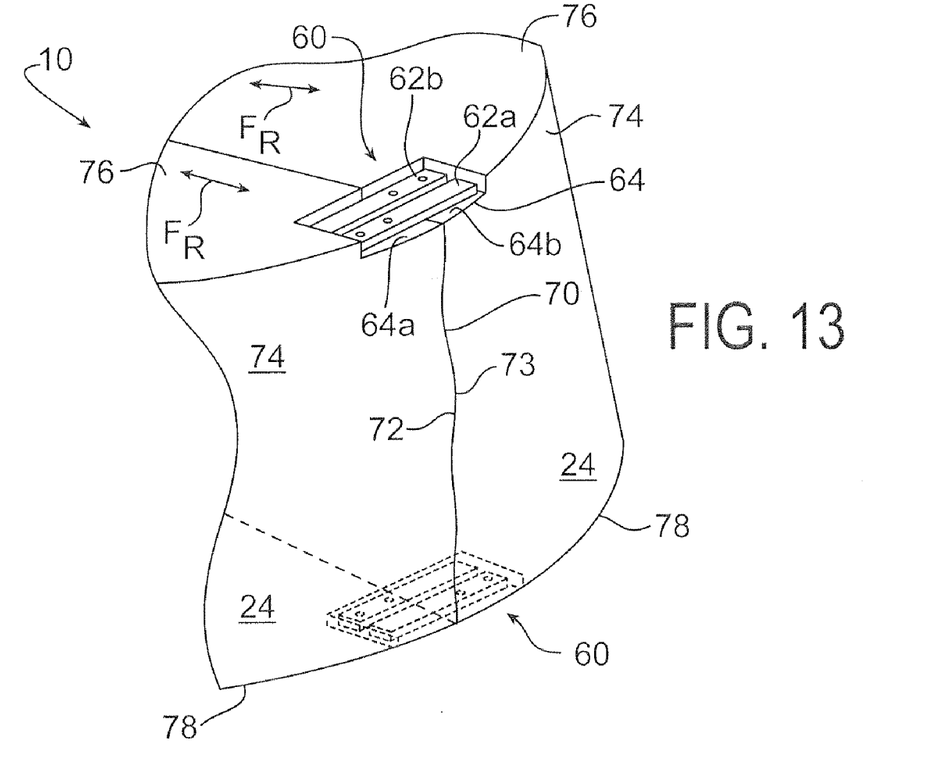
FIG. 13 is a top perspective view of the upper mold portion of FIG. 7, showing an alternative embodiment of the synchronization member and member-receiving cavity, according to the present invention.
Figure 14:
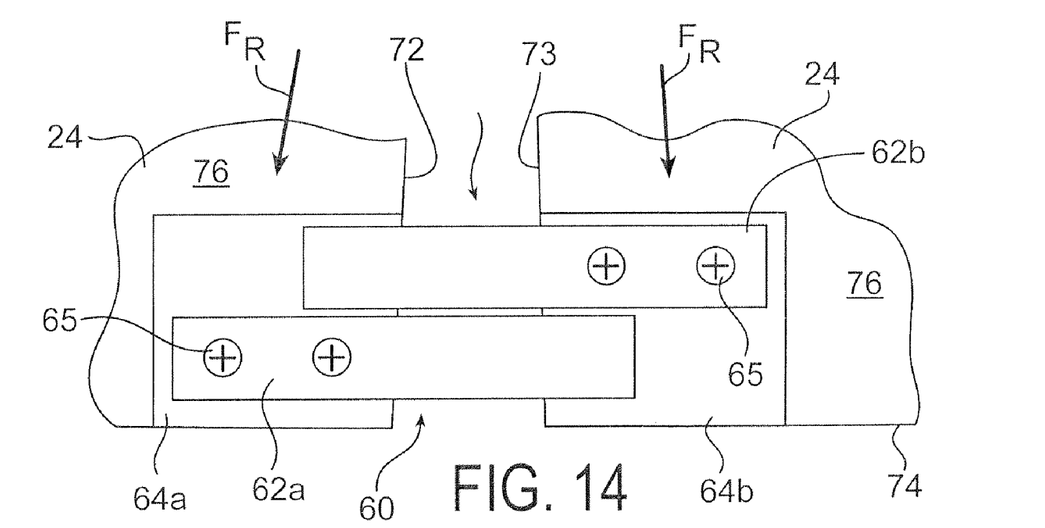
FIG. 14 is a top sectional view of the embodiment shown in FIG. 13, shown in similar fashion to the embodiment of FIG. 12 while the mold sections are translating between open and closed positions.

With reference to FIGS. 13-14, another embodiment of the vertical alignment combination 60 is shown. As mentioned above, synchronization members 62 may extend from any surface of any section 24, 34. Accordingly, for example, the embodiment shown in FIGS. 13-14 provides one or more members 62 extending from an end surface 76 and/or a parting line surface 78 of any upper and/or lower section 24, 34. Parting line surface 78 generally represents surface 29 of upper section 24 and surface 39 of lower section 34.

In the embodiment shown in FIGS. 13-14, multiple synchronization members 62, shown as 62a, 62b extend from each section 24, 34, and across segment line (or plane) 70, which generally extends between adjacent sections 24 and adjacent sections 34. It is contemplated that in any embodiment, including those discussed in association with FIGS. 7-12, multiple synchronization members 62 may extend from each section 24, 34 as desired, such as, for example, to provide additional strength or rigidity while maintaining sections 24, 34 in vertical alignment during opening and closing operations. In the embodiment shown in FIGS. 13-14, a synchronization member 62 extends from each opposing section 24, 34 along segment line 70, wherein the synchronization members 62 are in close relation or substantially adjacent to each other to form a pair of synchronization members 62a, 62b that operate cooperatively to locally maintain a vertical alignment of the associated sections 24, 34. It is also contemplated that synchronization members 62 may extend from a plurality of locations without close association with other synchronization members 62, which is generally represented in one embodiment by FIGS. 7-12. In other embodiments, such as the embodiments shown in FIGS. 13-14 by way of example, a cooperative pair of synchronization members 62a, 62b may not exist, and instead an independent member 62 may act along an end surface 76 or parting line surface 78 (i.e., only one of the pair may exist). It follows that synchronization members 62, whether provided as cooperative pairs of members 62a, 62b or as independent members 62, may exist along any surface of each section 24, 34, which includes surfaces 72, 73, 74, 76, and 78. It is also contemplated that the pair of cooperative members 62a, 62b shown in FIGS. 13-14 along end surface 76 and parting line surface 78 may exist along only one of the end surface 76 and parting line surface 78 (i.e., only one pair may extend between adjacent sections 24 or adjacent sections 34).

In the embodiment shown in FIGS. 13-14, a member-receiving cavity 64 may extend along end surface 76 and parting line surface 78 of each associated section 24, 34. When a pair of cooperating synchronization members 62a, 62b is used, such members may extend along any portion of segment line 70. Accordingly, the pair of members 62a, 62b may from a surface associated with a section 24, 34, and extend to engage a surface of the adjacent section 24, 34. Such surfaces include surfaces 72, 73, 74, 76, and 78. In other embodiments, including that shown in FIGS. 13-14, at least one member of the pair of members 62a, 62b may extend to and/or from a member-receiving cavity 64, which comprises 64a and 64b. This may be desired to provide clearance between any member 62, including members 62a, 62b and other surrounding mold or press components. Specifically, in the embodiment shown, member 62a extends from cavity 64a and into cavity 64b, while corresponding member 62b extends from cavity 64b and into cavity 64a. Members 62a, 62b may be secured into corresponding sections 24, 34 by fasteners 65, or any other means of attachment or constraint, which includes welding, mechanical or frictional fit, or any other known method. Because the pair of members 62a, 62b may be located along surfaces 74 in similar fashion to the embodiments shown in FIGS. 7-12, members 62a, 62b may simply be placed into an aperture along a corresponding surface 72, 73.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A tire curing mold having a tire molding cavity, the mold comprising:
 an upper mold portion having a plurality of upper sections arranged annularly about the mold to form a first portion of the tire cavity and being radially translatable between mold open and mold closed positions;
 a lower mold portion including a plurality of lower sections arranged annularly about the mold to form a second portion of the tire cavity and being radially translatable between mold open and mold closed positions, wherein each of the lower sections are positioned adjacent one of the upper sections to form a plurality of pairs of upper and lower sections;
 a pin extending from a first section of each pair of upper and lower sections; and,
 an aperture extending within a second section of each pair of upper and lower sections, the aperture including an opening positioned for receiving a portion of the pin extending from the corresponding first section when the mold undergoes mold closing operations, the pin being positioned in the aperture when the mold is in the mold closed position and removed from the aperture when the mold is in the mold open position,
 wherein the aperture includes a ledge for engaging a ridge positioned along a length of the pin, the ledge extending in an inward direction of the aperture and the ridge extending outwardly from a side of the pin, the ridge having a first surface arranged on the bottom side of the ridge for engaging the aperture as the pin enters the aperture during mold closing operations, and the pin ridge having a second surface arranged on an upper side of the ridge for engaging the ledge as the pin is lifted during mold opening operations.

2. The mold of claim 1, wherein the aperture further includes an inwardly tapered surface for directing the pin into the opening of the aperture, and wherein the first surface of the ridge is tapered.

3. The mold of claim 1, wherein the pin includes an alignment portion, the alignment portion being sized to an approximate size of the aperture opening, the alignment portion being arranged along the pin length between the ridge and the first section.

4. The mold of claim 3, wherein the alignment portion of the pin is offset along the pin length from the ridge.

5. The mold of claim 1, wherein the aperture comprises an insert securely positioned within an aperture cavity formed in the second section.

6. The mold of claim 1, wherein the first section of each of the plurality of pairs of upper and lower sections is one of the upper mold sections and the second section of each of the plurality of pairs of upper and lower sections is one of the lower mold sections.

7. The mold of claim 1 further comprising:
a plurality of upper vertical synchronization members, wherein each upper vertical synchronization member extends between one of a plurality of adjacent pairs of the upper sections, and from a first section of each pair of upper sections to slidably engage a second section of each pair of upper sections as the mold operates between the open and closed mold positions;
a plurality of lower vertical synchronization members, wherein each lower vertical synchronization member extends between one of a plurality of adjacent pairs of the lower sections, and from a first section of each pair of lower sections to slidably engage a second section of each pair of lower sections as the mold operates between mold open and mold closed positions.

8. The mold of claim 1, where the second surface of the ridge and the ledge are contoured.

9. The mold of claim 8, where the second surface of the ridge is tapered.

10. The mold of claim 1, wherein the aperture includes a compressible member positioned for engagement with the pin as the aperture receives the pin during mold closing operations.

11. The mold of claim 10, wherein the compressible member is a spring.

12. A tire curing mold having a tire molding cavity, the mold comprising:
an upper mold portion having a plurality of upper sections arranged annularly about the mold to form a first portion of the tire cavity and being radially translatable between mold open and mold closed positions;
a lower mold portion including a plurality of lower sections arranged annularly about the mold to form a second portion of the tire cavity and being radially translatable between mold open and mold closed positions, wherein each of the lower sections are positioned adjacent one of the upper sections to form a plurality of pairs of upper and lower sections;
a pin extending from a first section of each pair of upper and lower sections; and,
an aperture extending within a second section of each pair of upper and lower sections, the aperture including an opening positioned for receiving a portion of the pin extending from the corresponding first section when the mold undergoes mold closing operations, the pin being positioned in the aperture when the mold is in the mold closed position and removed from the aperture when the mold is in the mold open position,
wherein the aperture includes a compressible member positioned for engagement with the pin as the aperture receives the pin during mold closing operations.

13. The mold of claim 12, wherein the aperture further includes a plate operating along an end of the compressible member for engagement with the pin.

14. The mold of claim 12, wherein the compressible member is a spring.

15. The mold of claim 12, wherein the pin includes an alignment portion, the alignment portion being sized to an approximate size of the aperture opening, the alignment portion being arranged along the pin length between a ridge positioned along a length of the pin and the first section from which the pin extends.

16. A tire curing mold operating between open and closed positions, the mold comprising:
a first plurality of adjacent sections arranged to form an expandable ring, the first plurality of adjacent sections forming a portion of a tire molding cavity and being radially translatable in a radial direction of the ring between mold open and mold closed positions, each adjacent section of the first plurality of adjacent sections having a pair of opposing sides spaced apart in a circumferential direction of the expandable ring;
one or more first synchronization members extending between a pair of adjacent sections of the first plurality of adjacent sections, the pair of adjacent sections comprising a first section and a second section and the one or more first synchronization members projecting outwardly from a side surface arranged along one of the pair of sides of the first section and towards a first side of the pair of opposing sides of the second adjacent section of the pair of adjacent sections wherein each first synchronization member extends from the first adjacent section to slidably engage the second adjacent section of the pair of adjacent sections when the first plurality of sections are translating between the open and closed positions; and,
a first plurality of synchronization member-receiving cavities, each member-receiving cavity positioned in the second adjacent section of the pair of adjacent sections of the first plurality of adjacent sections and located in engagable relation to one of the one or more first synchronization members extending from the first adjacent section of the pair of adjacent sections of the first plurality of adjacent sections, each synchronization member configured to slidably engage one of the first plurality of synchronization member-receiving cavities, wherein one or more of the first plurality of member-receiving cavities are located along both a side surface of the first side of the pair of opposing sides of the second adjacent section and a radially outer side surface of the second adjacent section of the pair of adjacent sections, the radially outer side surface being arranged between the pair of opposing sides being spaced in a circumferential direction of the expandable ring.

17. The mold of claim 16, wherein each of the one or more synchronization members extends substantially parallel to a mold centerline.

18. The mold of claim 16, wherein the first plurality of adjacent sections are upper sections of the mold.

19. The mold of claim 16, wherein the one or more synchronization members extending between the pair of adjacent sections of the first plurality of adjacent sections comprises a pair of cooperating first synchronization members extending between the pair of adjacent sections, wherein each of the cooperating first synchronization members is attached to and extends from opposite sections of the pair of adjacent sections of the first plurality of adjacent sections.

20. The mold of claim 16, wherein each of the first synchronization members is a bar or pin.

21. The mold of claim 16, wherein one of the one or more of the first plurality of member-receiving cavities are also located along an end surface of the second adjacent section of the pair of adjacent sections and one of the one or more of the first plurality of member-receiving cavities are located along a parting line surface of the second adjacent section of the pair of adjacent sections, the end surface and the parting line surface being spaced apart in an axial direction of the expandable ring such that the radially outer side surface and the pair of opposing side surfaces of the second adjacent section are arranged between the end surface and the parting line surface.

\* \* \* \* \*